United States Patent [19]
Smith et al.

[11] 3,920,845
[45] Nov. 18, 1975

[54] 2-NITROINDAN-1,3-DIONE

[75] Inventors: Harry Smith, Maplehurst near Horsham; Derek Richard Buckle, Roffey near Horsham; Barbara Anne Spicer, Guildford; Esther Beatrice Wade, South Croydon, all of England

[73] Assignee: Beecham Group Limited, United Kingdom

[22] Filed: Aug. 28, 1974

[21] Appl. No.: 501,139

Related U.S. Application Data

[63] Continuation-in-part of Ser. No. 277,625, Aug. 3, 1972, abandoned.

[30] Foreign Application Priority Data

Aug. 3, 1971 United Kingdom............... 36379/71

[52] U.S. Cl. .............................................. 424/331
[51] Int. Cl.$^2$........................................ A61K 31/12
[58] Field of Search.................................... 424/331

[56] References Cited
UNITED STATES PATENTS

| | | | |
|---|---|---|---|
| 2,820,738 | 1/1958 | Litvan et al.......................... | 424/331 |
| 2,899,358 | 8/1959 | Sperber................................ | 424/331 |
| 3,356,732 | 12/1967 | Becker................................ | 424/331 |

OTHER PUBLICATIONS

Vanags et al., Chemical Abstracts 53:1270(c), (1959).

Primary Examiner—Norman A. Drezin

[57] ABSTRACT

Allergic conditions such as asthma, hay fever and rhinitis are treated with daily doses of 2-nitroindan-1,3-dione or the equivalent amount of a pharmaceutically acceptable salt orally, parenterally or by insufflation. The salt is an alkali metal salt or a salt with an organic base such as an amine or amino compound. The average daily dose is 400–700 mg.

16 Claims, No Drawings

2-NITROINDAN-1,3-DIONE

CROSS REFERENCE

This application is a continuation-in-part of our application Ser. No. 277,625 filed the Aug. 3, 1972, now abandoned.

This invention relates to pharmaceutical compositions which are useful in the inhibition of the effects of certain types of antigen-antibody reactions and are therefore useful in the prophylaxis and treatment of diseases associated with allergic or immunological reactions, e.g. asthma and have fever, and also in the treatment of rhinitis and bronchitis.

According to the present invention there is provided a pharmaceutical composition comprising as active ingredient 2-nitroindan-1,3-dione or a pharmaceutically acceptable non-toxic salt thereof, and one or more pharmaceutically acceptable carriers, said composition being in a form suitable for administration to human beings.

According to one embodiment of the present invention the pharmaceutical composition is in the form of a microfine powder, wherein at least 90% of the microfine particles have diameters of less than 5 microns. The salts of 2-nitroindan-1,3-dione include the alkali metal salts, e.g. sodium or potassium, and salts with organic bases such as amines or amino compounds.

The compound 2-nitroindan-1, 3-dione has the structural formula

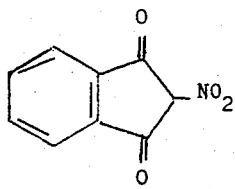

and is a known compound. In the past it has been used in preparative chemistry and in analytical chemistry (where its major use has been in forming crystalline salts with organic bases and amino acids). To the best of our knowledge, no form of useful biological activity has been reported for the compound or its salts, and therefore it has never been incorporated in pharmaceutical compositions.

However, to put this invention into proper perspective, it should perhaps be mentioned that some other compounds which are derivatives of indandione are known to have anticoagulant activity. There is nothing in the published literature which would lead one to suspect that 2-nitroindan-1, 3-dione would show the inhibitory effects now observed.

The composition of this invention may be presented as a microfine powder for insufflation, e.g., as a snuff or in capsules of hard gelatine. It may also be presented together with a sterile liquid carrier for injection. The composition of this invention is effective when given orally, and in such cases the composition may be in the form of tablets, capsules or syrups. Preferably the compositions of this invention are presented in unit dosage form, or in a form in which the patient can administer to himself a single unit dosage. If desired, a small amount of a bronchodilator compound such as isoprenaline may be incorporated in the compositions of this invention, both to inhibit the cough response if the composition is insufflated and to provide immediate relief during an asthmatic attack.

The effective dose of 2-nitroindan-1, 3-dione necessary in the prophylaxis of asthma, for example, may vary according to the condition of the patient. However, in general, a daily dose of from 8 to 12 mg/kg of the 2-nitroindan-1, 3-dione (or if a salt is used, an amount sufficient to provide from 8 to 12 mg/kg of the 2-Nitroindan-1,3-dione) is effective. For the average adult human being, this would usually amount to a daily dose of from 400 to 700 mg.

The precise nature of the pharmaceutical carrier used in the compositions of this invention is not important. Standard pharmaceutical practice may be followed in formulating the compounds of this invention, but it is perhaps worth noting that if the composition is to be administered by insufflation, a microfine powder where substantially all the particles have diameters of less that 50 microns, is preferred. For example, in the preparation of such compounds, the 2-nitroindan-1, 3-dione may be mixed with a substantially non-hygroscopic carrier such as lactose or mannitol and the resultant mixture may be granulated and micronised to give a powder wherein at least 90% by number of the particles have diameters below 5 microns. The powder may then be filled into pierceable capsules of hard gelatin for use in insufflation devices such as are described in British Patent Specifications Nos. 1,182,779 and 1,122,284.

The following examples illustrate the present invention.

EXAMPLE 1

The preparation of the sodium salt of 2-nitroindan-1, 2-nitroindan-1, 3-dione

2-Nitroindan-1, 3-dione (38g) was suspended in water (100ml) and added to a solution of sodium hydroxide (8g) in water (100ml). The mixture was stirred until clear and then stood overnight at 5°. Yellow crystals formed and were separated by filtration, washed with a little water and recrystallised by dissolving in boiling water and allowing to cool, the recrystallisations being repeated until a solid having a neutral solution in water was obtained. The final solid was dried in vacuo over phosphorus pentoxide to give the sodium salt of 2-nitroindan-1, 3-dione (27g) m.p. above 300°. (Found: C, 50.4; H, 1.9; N, 6.6; Na, 10.7; $C_9H_4NNaO_4$ requires: C, 50.7; H, 1.9; N, 6.6; Na, 10.8%.)

EXAMPLE 2

The compound 1,3-bis[2-carboxychromon-5-yloxy]-2-hydroxypropane, (approved name disodium chromoglycate) is currently used for the prophylaxis and treatment of asthma and is being recommended for the treatment of rhinitis. It causes very few pharmacological reactions, but the main effect of the drug that has been demonstated is that if it is present in a system when antigen is used to challenge cells, which have been previously sensitised with reaginic antibody, then it reduces the release of materials such as histamine, which are responsible for mediating allergic reactions. In in vitro and in vivo systems described below used to demonstrate this, 2-nitroindan-1, 3-dione was at least as active as disodium chromoglycate. In the in vivo system 2-nitroindan-1, 3-dione was effective for longer than disodium chromoglycate and was effective when given orally.

a. Rat passive outaneous anaphylaxis cutaneous test

The in vivo test used to compare disodium chromoglycate with with 2-nitroindan-1, 3-dione was the rat passive cutaneous test. Carworth Wistar male rats 250–300 g. were used throughout.

i. Production of serum containing homocytotropic antibody

Serum containg antibody with properties similar to human reagin was raised in rats by a method similar to that previously described (I. Mota, Life Science, 1963, 12, 917-927).

Rats were injected intraperitoneally with *Bordatella pertussis* vaccine (0.5ml containing $40 \times 10^9$ dead organisms per ml) and injected subcutaneously with an emulsion of egg albumin (0.5ml of a 5% solution) in incomplete Freund's adjuvant.

After 18 days blood was taken from the rats by cardiac puncture. Serum was separated and stored to $-20°$ until required.

ii. Passive cutaneous anaphylaxis (c.f. J. Goose and A. M. J. N. Blair, Immunology, 1969,16, 749–760)

Six serial dilutions of the serum from ¼ to 1/128 were prepared in 0.9% saline. Each dilution (0.lml) was injected intradermally into separate sites on the shaved dorsal surface of a rat. 72 hours later the rats were challenged by intravenously injecting a solution of egg albumin (0.3ml. of a 1% solution made up in 0.9% brine) previously mixed with a solution of pontamine sky blue (0.2ml of a 5% solution). Combination of egg albumin with reagin-like antibody of this specificity at the site of the injection of the latter caused a complex series of reactions leading to capillary dilation and extravasation of the blue dye seen as a blue wheal. The rats were killed twenty minutes after challenge by injection of Euthatal. The diameters of the blue wheals were then measured in millimetres.

Compounds were tested for their ability to reduce the diameter of the blue wheals. The compounds under test were administered prior to challenge by the route indicated at the times before challenge shown in Table 1. 2-nitroindan-1, 3-dione was administered as its sodium salt in water, i.e. neutralised with $NaHCO_3$.

TABLE 1

Activities of 2-nitroindan-1, 3-dione sodium salt (NID) and disodium chromoglycate (DCG) in the rat PCA test.

| Dose mg/kg | Route of administration | Time between dosing and challenge, mins. | % Inhibition of PCA response NID | DCG |
|---|---|---|---|---|
| 3 | subcutaneous | 0 | 15 | 14 |
| 5 | | | 38 | 24 |
| 7 | | | 40 | 60 |
| 10 | | | 36 | 49 |
| 14 | | | 74 | 79 |
| 20 | | | 88 | 83 |
| 50 for NID | subcutaneous | 0 | 100 | 65 |
| 40 for DCG | | 10 | 66 | 84 |
| | | 20 | 43 | 42 |
| | | 30 | 49 | 26 |
| | | 40 | 34 | 9 |
| | | 50 | 36 | 0 |
| | | 60 | 26 | −16 |
| | | 120 | −15 | −22 |
| 100 | Oral | 0 | 23 | −17 |
| | | 10 | 66 | |
| | | 15 | 48 | |
| | | 20 | 43 | |
| | | 30 | 71 | − 6 |
| | | 40 | 34 | |
| | | 45 | 42 | |
| | | 50 | 36 | |
| | | 60 | 26 | |

TABLE 1-continued

Activities of 2-nitroindan-1, 3-dione sodium salt (NID) and disodium chromoglycate (DCG) in the rat PCA test.

| Dose mg/kg | Route of administration | Time between dosing and challenge, mins. | % Inhibition of PCA response NID | DCG |
|---|---|---|---|---|
| | | 120 | | 15 |

In Table 1 the activity of the drug is expressed in terms of its ability to reduce the size of the blue wheals as the percentage inhibition of the response in the control group of rats. The percentage inhibition is calculated by using the results obtained from the sites of the lowest two dilutions of antibody to which all the controls are positive. These results are summed for the control anad the test groups (usually 6 rats in each group) and the mean of the test group is expressed as a percentage of the mean of the control group. The figure obtained is subtracted from 100 and the results are then expressed as % inhibition.

% Inhibition of PCA response = $100 (1-a/b)$ a is the mean of the sum of the wheal diameters of the test group of animals using only those wheals produced at the lowest dilutions of anti-serum to which all the controls are positive.

b. is the mean of the sum of the wheal diameters of the control group of animals using only those wheals produced at the lowest dilutions of anti-serum to which all the controls are positive.

b. Passively sensitised chopped human lung

The in vitro method used to compare disodium chromoglycate with 2-nitroindan-1, 3-dione sodium salt was a modification of that described: Sheard, P., Killingback, P. G., and Blair, A. M. J. N., Nature, Lond., 1967, 216, 283; Sheard, P., and Blair, A. M. J. N., Int. Arch. Allergy Appl. Immun. 1970,38, 217.

Fresh human lung tissue from the apparently unaffected areas of tissue removed from patients undergoing surgery for carcinoma was used. Within one hour of removal from the patient the tissue was placed into previously well oxygenated Tyrode solution (Tyrode solution from which the ions of calcium and magnesium have been omitted) at 5°. As soon as possible afterwards, pleural membranes and hard tissue were removed from the sample and the remaining soft tissue was chopped on a mechanical chopper into pieces approximately 1 mm. square.

As little time was lost as possible. The chopped lung was suspended in continuously oxygenated incomplete Tyrode. The tissue was then removed by gentle filtration and washed until the filtrate was clear with oxygenated incomplete Tyrode.

Approximately 40 samples (each of 300 mg) of the chopped washed tissue were each suspended in well oxygenated incomplete Tyrode solution (3ml). A few of the samples were retained as negative controls. To each of the remainder was added human serum, from an atopic person with a hypersensitivity to a known antigen, so that the serum was diluted one part in ten in the final suspension. To the negative control samples sufficient Tyrode solution was added to make the final volume the same as for the other samples. The samples were allowed to stand overnight at room temperature, followed by two hours at 37° with shaking. The samples were then washed with Tyrode solution (40ml) and separated by decantation.

To the samples was then added incomplete Tyrode solution (to a final volume of 3ml) and for some samples different amounts of the compound under examination were dissolved in the incomplete Tyrode. The suspensions were warmed at 37° for ten minutes. To each was then added at 37° a solution of the relevant antigen dissolved in complete Tyrode. For the results reported in Table 2, the human serum used to sensitise the lung was from a patient showing hypersensitivity to mixed grass pollens. The antigen used for challenge was a glycerol extraction mixture of mixed grass pollens (60,000 Noon units/ml) diluted in complete Tyrode (300 Noon units to final volume of 3ml). After 10 minutes at 37° the supernatants were separated by decanting and stored at −20° until assayed the following day for histamine content. Histamine was assayed by comparing the effects of the solutions on a strip of guinea pig ileum with the contractions produced on the strip by standard solutions of histamine. The histamine contents of the solutions were calculated at ng/ml.

Concentrations of the compounds under examination were pre-tested alone in Tyrode solution on the strip of guinea pig ileum to ensure that they produced no direct effects. At the concentrations used 2-nitroindan-1, 3-dione sodium salt and disodium chromoglycate did not. The percentage inhibition of histamine release was calculated:

% Inhibition of histamine release:

$$100 \left[ 1 - \frac{\text{concentration of histamine in the test solution} - \text{negative control}}{\text{positive control} - \text{negative control}} \right]$$

The negative control is the concentration of histamine in the solution decanted from the sample treated with no serum and no drug but to which antigen was added. The positive control is the concentration of histamine in the solution from the sample treated with serum but with no drug and challenged with antigen.

Results are shown in Table 2.

TABLE 2

HISTAMINE RELEASE FROM PASSIVELY SENSITISED AND CHOPPED HUMAN LUNG

| Sample No. | Treatment of Sample | | | | Histamine content of supernatent ng/ml | mean ng/ml | % Inhibition of Histamine Release |
|---|---|---|---|---|---|---|---|
| 1 | Negative control No. sensitisation. | No Drug. | | Challenged | 20 | | |
| 2 | " | " | | " | 17.5 | 19.8 | |
| 3 | " | " | | " | 22 | | |
| 4 | Positive Control Sensitised. | No Drug. | | Challenged | 163 | | |
| 5 | " | " | | " | 135 | 166 | |
| 6 | " | " | | " | 200 | | |
| 7 | Test Samples Sensitised. | 1 mg/ml | NID | Challenged | 94 | | |
| 8 | " | " | | " | 75 | 89 | 46 |
| 9 | " | " | | " | 100 | | |
| 10 | " | 100 μg/ml | NID | " | 105 | | |
| 11 | " | " | | " | 150 | 115 | 31 |
| 12 | " | " | | " | 100 | | |
| 13 | " | 10 μg/ml | NID | " | 123 | | |
| 14 | " | " | | " | 75 | 118 | 29 |
| 15 | " | " | | " | 156 | | |
| 16 | " | 1 μg/ml | NID | " | 156 | | |
| 17 | " | " | | " | 156 | 156 | 7 |
| 18 | " | " | | " | lost | | |
| 19 | " | 0.1 μg/ml | NID | " | 168 | | |
| 20 | " | " | | " | 187 | 168 | −1 |
| 21 | " | " | | " | 149 | | |
| 22 | " | 0.01 μg/ml | NID | " | 149 | | |
| 23 | " | " | | " | 121 | 171 | −3 |
| 24 | " | " | | " | 243 | | |
| 25 | " | 1 mg/ml | DCG | " | 93 | | |
| 26 | " | " | | " | 125 | 118 | 29 |
| 27 | " | " | | " | 137 | | |
| 28 | " | 100 μg/ml | DCG | " | 63 | | |
| 29 | " | " | | " | 119 | 104 | 37 |
| 30 | " | " | | " | 132 | | |

EXAMPLE 3

Formulation of 2-nitroindan-1,3-dione as capsules

Capsules containing (i) 150 mg. (ii) 100 mg. and (iii) 50 mg. of active ingredient were prepared as follows:

i. Size 00 hard gelatine capsules were filled with a powder having the below composition: ;

| | mg/capsule |
|---|---|
| 2-Nitroindan-1,3-dione | 150.0 |
| Lactose B.P. | 255.3 |
| Pre-gelatinised Starch | 30.0 |
| Moisture | 2.1 |
| Magnesium Stearate B.P. | 2.1 |
| Starch B.P. (dried) | 10.5 |
| TOTAL WEIGHT | 450.0 | ii. Size 0 hard gelatine capsules were filled with a powder having the below composition:

| | mg/capsule |
|---|---|
| 2-Nitroindan-1,3-dione | 100.0 |
| Lactose B.P. | 170.2 |
| Pre-gelatinised Starch | 20.0 |
| Moisture | 1.4 |
| Magnesium Stearate B.P. | 1.4 |
| Starch B.P. (dried) | 7.0 |
| TOTAL WEIGHT | 300.0 | iii. Size 2 hard gelatine capsules were filled with powder having the below composition:

|   | mg/capsule |
| --- | --- |
| 2-Nitroindan-1,3-dione | 50.0 |
| Lactose B.P. | 85.1 |
| Pre-gelatinised Starch | 10.0 |
| Moisture | 0.7 |
| Magnesium Stearate B.P. | 0.7 |
| Starch B.P. (dried) | 3.5 |
| TOTAL WEIGHT | 150.0 |

EXAMPLE 4

Formulation of 2-nitroindan-1,3-dione as tablets

Tablets containg (i) 150 mg. (ii) 100 mg. and (iii) 50 mg. of active ingredient were prepared as follows:

i. A powder of the below composition, less the Starch B.P. disintegrant, was granulated, the Starch B.P. disintegrant added and the resultant compression mixture compressed to give tablets, each containing 150 mg. of active ingredient.

|   | mg/tablet |
| --- | --- |
| 2-Nitroindan-1,3-dione | 150.0 |
| Lactose B.P. | 255.3 |
| Pre-gelatinised Starch | 30.0 |
| Moisture | 2.1 |
| Magnesium Stearate B.P. | 2.1 |
| Starch B.P. (dried) | 10.5 |
| TOTAL WEIGHT | 450.0 | ii. Tablets, each containing 100 mg. of active ingredient, were prepared as in (i), but from a powder having the following composition.

|   | mg/tablet |
| --- | --- |
| 2-Nitroindan-1,3-dione | 100.0 |
| Lactose B.P. | 170.2 |
| Pre-gelatinised Starch | 20.0 |
| Moisture | 1.4 |
| Magnesium Stearate B.P. | 1.4 |
| Starch B.P. (dried) | 7.0 |
| TOTAL WEIGHT | 300.0 | iii. Tablets, each containing 50 mg. of active ingredient, were prepared as in (i), but from a powder having the following composition:

|   | mg/tablet |
| --- | --- |
| 2-Nitroindan-1,3-dione | 50.0 |
| Lactose B.P. | 85.1 |
| Pre-gelatinised Starch | 10.0 |
| Moisture | 0.7 |
| Magnesium Stearate B.P. | 0.7 |
| Starch B.P. (dried) | 3.5 |
| TOTAL WEIGHT | 150.0 |

EXAMPLE 5

Formulation of 2-nitroindan-1,3-dione for insufflation i. 2-Nitroindan-1,3-dione in the form of a powder was granulated and micronised to give a powder wherein substantially all of the particles had a diameter below 5 microns. No. 2 hard gelatine capsules were then filled with 40 mg/capsule of this micronised powder.

ii. No. 2 hard gelatine capsules were filled with 20 mg/capsule of 2-nitroindan-1,3-dione, which had been granulated and micronised as in (i), and with 20 mg/capsule of Lactose B.P.

EXAMPLE 6

Formulation of 2-nitroindan-1,3-dione for parenteral use i. 25 mg. of sterile anhydrous 2-nitroindan-1,3-dione was filled into a suitable vial under sterile conditions for subsequent reconstitution with sterile water to 5 ml.

ii. 25 mg. of anhydrous 2-nitroindan-1,3-dione was dissolved in 5 ml. of double distilled water, sterile filtered into a suitable vial and freeze dried for subsequent reconstitution with sterile water to 5 ml.

iii. 25 mg. of anhydrous 2-nitroindan-1,3-dione was dissolved in 5 ml. of double distilled water, sterile filtered into a suitable size amber glass ampoule and then flame sealed.

EXAMPLE 7

Formulation of 2-nitroindan-1,3-dione as a syrup i. A syrup containing 125 mg. of active ingredient per 25 ml. of syrup was prepared by mixing the following ingredients:

|   | mg/25 ml. |
| --- | --- |
| 2-Nitroindan-1,3-dione | 125.0 |
| Syrup B.P. | 21.2 ml. |
| Citric acid B.P. | 125.0 |
| p-Hydroxy benzoate preservative | 25.0 |
| Colour and Flavouring | qs. |
| Water to | 25.0 ml. | ii. A syrup containing 50 mg. of active ingredient per 10 ml. of syrup was prepared by mixing the following ingredients:

|   | mg/10 ml. |
| --- | --- |
| 2-Nitroindan-1,3-dione | 50.0 |
| Syrup B.P. | 8.5 ml. |
| Citric acid B.P. | 50.0 |
| p-Hydroxy benzoate preservative | 10.0 |
| Colour and Flavouring | qs. |
| Water to | 10.0 ml. | iii. A sucrose free syrup containing 50 mg. of active ingredient per 10 ml. of syrup was prepared by mixing the following ingredients:

|   | mg/10 ml. |
| --- | --- |
| 2-Nitroindan-1,3-dione | 50.0 |
| Sodium Saccharin B.P. | 11.1 |
| Citric acid B.P. | 25.0 |
| Hydroxyethyl cellulose | 135.0 |
| p-Hydroxy benzoate preservative | 10.0 |
| Colour and Flavouring | qs. |
| Water to | 10.0 ml. |

We claim:

1. A pharmaceutical composition for the prophylaxis or treatment of asthmatic symptoms and hay fever comprising an effective amount 2-nitroindan-1,3-dione or a pharmaceutically acceptable non-toxic salt thereof as the active ingredient, in combination with a pharmaceutically acceptable carrier.

2. A pharmaceutical composition according to claim 1 in the form of a microfine powder wherein at least 90 percent of the microfine powder particles have diameters of less than 5 microns.

3. A pharmaceutical composition according to claim 2 wherein the carrier is lactose or mannitol.

4. A pharmaceutical composition according to claim 1 in oral administration form.

5. A pharmaceutical composition according to claim 4 in tablet form.

6. A pharmaceutical composition according to claim 4 in capsule form.

7. A pharmaceutical composition according to claim 4 in syrup form.

8. A pharmaceutical composition according to claim 1 in insufflation administration form.

9. A pharmaceutical composition according to claim 1 wherein the carrier is a sterile aqueous carrier and the composition is in injectable form.

10. A pharmaceutical composition according to claim 1 in dosage unit form wherein each unit contains from 400 to 700 mg of the 2-nitroindan-1,3-dione or the equivalent amount in salt form.

11. A pharmaceutical composition according to claim 2 which further comprises a small amount of a bronchodilator.

12. A pharmaceutical composition according to claim 1 in the form of a microfine powder wherein substantially all the microfine powder particles have diameters of less than 50 microns.

13. A pharmaceutical composition according to claim 1 wherein the active ingredient is an alkali metal salt of 2-nitroindan-1,3-dione.

14. A pharmaceutical composition according to claim 1 wherein the active ingredient is the sodium salt of 2-nitroindan-1,3-dione.

15. A pharmaceutical composition according to claim 1 wherein the active ingredient is the potassium salt of 2-nitroindan-1,3-dione.

16. A method for the prophylaxis or treatment of asthmatic symptoms and hay fever in humans which comprises daily administering, orally or by insufflation, from 400 to 700 mg of 2-nitroindan-1,3-dione or an equivalent amount of a pharmaceutically acceptable non-toxic salt thereof.

* * * * *